March 31, 1970  J. F. DUMOND  3,503,249

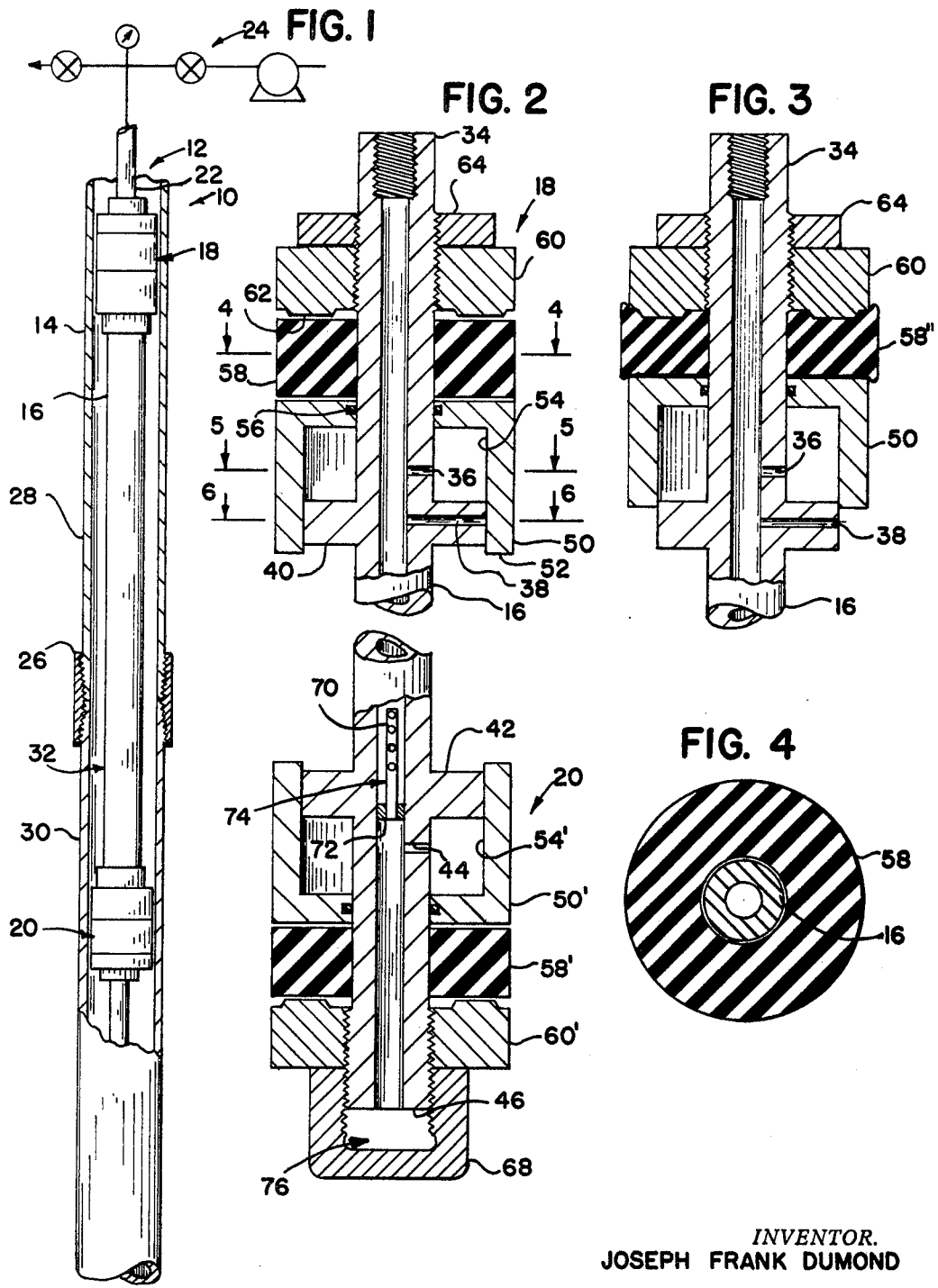

TOOL FOR TESTING PIPE JOINTS

Filed May 10, 1968  2 Sheets-Sheet 2

INVENTOR.
JOSEPH FRANK DUMOND
BY
MARCUS L. BATES

United States Patent Office 3,503,249
Patented Mar. 31, 1970

3,503,249
TOOL FOR TESTING PIPE JOINTS
Joseph Frank Dumond, 2001 Kermit Highway, Apt. 7, Odessa, Tex. 79760
Filed May 10, 1968, Ser. No. 728,286
Int. Cl. G01n 3/28
U.S. Cl. 73—49.1           8 Claims

ABSTRACT OF THE DISCLOSURE

A tool for testing pipe comprising a mandrel having upper and lower sealing members spaced apart thereon with the tool being slidably received within a joint of pipe. When pressure is applied to the mandrel, the upper and lower sealing members movably respond to the applied pressure to thereby seal the interior of the length of pipe which is located between the upper and lower sealing members. The annular space about the mandrel and between the sealing members is then pressurized to a predetermined magnitude of pressure after which the pressure is held static while it is observed in order to ascertain the presence of any leaks.

Background of the invention

In the oil production and drilling art, it is desirable to test joints of pipe in order to detect the presence of flaws therein. It is especially desirable to test threaded screw connections where one joint of pipe is threadedly secured to another joint. Various prior art apparatus are known to those skilled in the art for testing joints of pipe, including production tubing, drill pipe, as well as other tubular goods, some of which are attached to one another by a box and pin, while others are threadedly secured to one another by a coupling. Sometimes it is desirable to test the threaded connections which are formed where one joint of pipe is threadedly or otherwise affixed to an adjacent joint. At other times it is desirable to test both the joint of pipe along with the screw threaded connection.

Pipe testing is sometimes conducted with the pipe being horizontally disposed upon a pipe rack, and at other times it is desirable to test the pipe while the pipe is held in the vertical position with the lower extremity thereof continuing into the bore hole as a string of pipe.

Many of the prior art apparatus or tools for testing joints of pipe generally include several check valves which are upset at predetermined pressures in order to set a packer for isolating a portion of the pipe. Scale, debris, and other foreign matter accumulates within the tool over a period of time and eventually causes malfunction of the various check valves. The complexity of the prior art tools generally precludes field disassembly and cleaning thereof, and accordingly, a malfunction is costly because of the down-time of the operation which is awaiting the completion of the tests.

Summary of the invention

This invention comprehends a tool for testing joints of pipe. The tool is comprised of a mandrel having upper and lower spaced apart sealing members attached thereto with the sealing members being concentrically arranged with respect to the mandrel. The tool is telescopingly or slidably received within the stand of pipe to be tested. The tool is positioned whereby the area which is to be tested is located between the upper and lower sealing members. Pressure applied to an inside passageway of the mandrel first actuates each sealing member. The action of a movable member in response to the applied pressure sets a packer associated with each sealing member. After the pressure has firmly set the packer, the uppermost sealing member uncovers a port allowing fluid flow into the annular chamber which is formed between the two sealing members and the inside pipe wall. The pressure is then maintained static for a sufficient amount of time to determine if fluid flow occurs from the annulus through any defect located within the area of the pipe undergoing test. Release of pressure from the mandrel enables the sealing members to be retracted or released from the inside peripheral wall surface of the pipe, whereupon the tool can then be positioned in the next area to be tested.

It is therefore an object of the present invention to provide an improved tool for testing pipe wherein the tool enables a predetermined pressure to be exerted against a limited length along the inside peripheral wall surface of the pipe.

Another object of the present invention is to provide a tool for testing joints or stands of pipe wherein the tool may be slidably inserted in a telescoping manner into previously run well casing, drill pipe, or production pipe.

Another object of the present invention is to provide a tool for testing joints of tubular goods wherein the tool is slidably received at any location within the length of pipe.

Another object of the present invention is to provide a tool which seals off a predetermined length of pipe at spaced apart points to thereby enable pressurization of the pipe between the spaced apart sealed areas.

A still further object of the present invention is the provision of a tool for testing joints of pipe and the like wherein the tool includes a minimum number of parts and which enables testing to be carried out in a more efficient and economical manner.

Still another object of the present invention is the provision of a tool for testing joints of tubular goods wherein the tool can be readily modified to test a multiplicity of different size pipe.

The above objects are attained in accordance with the present invention by the provision of an improved tool for testing pipe which is telescopingly received therein. The tool includes two spaced apart sealing members located at each extremity of a mandrel. The sealing members are set by pressure being applied to a central passageway located within the mandrel, after which one of the sealing members causes pressurization of the inside peripheral wall surface of the pipe located between each sealing member.

These and other objects of the present invention will become apparent to those skilled in the art as the description proceeds.

Brief description of the drawings

FIGURE 1 is an elevational view of a tool made in accordance with the teachings of the present invention, with the tool being shown located within a pipe which is undergoing hydrostatic tests;

FIGURE 2 is a longitudinal cross-sectional view of the tool seen in FIGURE 1, with some additional parts being shown for clarity;

FIGURE 3 is a fragmentary cross-sectional view of the tool seen in FIGURE 2, but shown in the operative position.

FIGURE 4 is a cross-sectional view taken along line 4—4 of FIGURE 2;

Detailed description of the various embodiments

Figure 5:
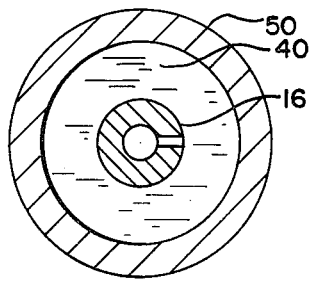
FIGURE 5 is a cross-sectional view taken along line 5—5 of FIGURE 2.
Figure 6:
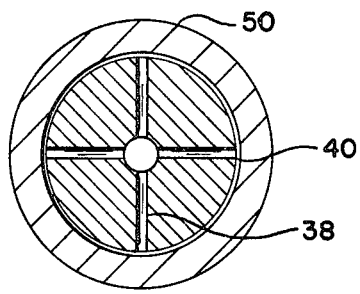
FIGURE 6 is a cross-sectional view taken along line 6—6 of FIGURE 2.

Looking specifically to the details of the drawings, wherein like or similar numerals apply to various like or similar elements throughout the different figures, the arrow at numeral 10 generally indicates a tool made in accordance with the present invention. The tool is seen to be telescopingly received through end portion 12 of pipe string 14, which is made up of numerous joints of pipe. A mandrel 16 carries thereon spaced apart upper and lower sealing members 18 and 20, respectively. A source of pressure is connected to the mandrel by means of tubing 22. The pressure source is controlled by a pump, valve means, and pressure gauge, all of which are generally indicated by the arrow at numeral 24, and all of which are known and understood by those skilled in the art.

Still looking at FIGURE 1, the before mentioned pipe 14 is intended to include any tubular goods, including drill pipe, casing, and production tubing. The pipe is made up of a multiplicity of sections or joints 28 and 30, each of which are joined together by a coupling member 26. As will be evident to those skilled in the art, the tool is positioned in a manner to test the threaded connections at coupling member 26, although the entire joint along with the coupling member could be tested by further elongating mandrel 16.

Looking now to the details of FIGURES 2 through 6 there is disclosed in greater detail the before mentioned tool of FIGURE 1. The mandrel 16 includes an upper terminal end 34 which is provided with a threaded connection to enable tubing 22 to be removably connected thereto in a fluid tight manner. Vertically spaced apart radial ports or passageways 36 and 38 are connected to the longitudinal passageway of the mandrel for a purpose which will be more fully explained later on. The second radial passageway is located within the upper boss 40. A lower boss 42 is circumferentially disposed about the mandrel in a manner similar to the upper boss. Lower radial port 44 is provided through the wall of the mandrel. The lower terminal end 46 of the mandrel is provided with the illustrated screw threads.

The upper sealing member has a movable member 50 which includes a cylindrical downwardly depending skirt which terminates at edge portion 52, and an inside peripheral wall portion 54 which includes an inwardly depending cylindrical portion having O-rings 56 fitted therein in sealed relationship with respect to the outer peripheral wall surface of the mandrel. The inside cylindrical surface reciprocates in close tolerance relationship with respect to the outer peripheral wall surface of boss 40.

Packer 58 is provided with the indicated centrally located bore which receives the mandrel therethrough with the packer having a lower face received in abutting relationship against the upper end of the upper movable member. Abutment means 60 having a downwardly depending circumferentially extending engaging surface 62 on the lower face thereof is threadedly secured to the mandrel and is provided with locking nut 64, thereby securing the abutment means against inadvertent rotational movement. All of the threads are "left handed" to prevent disassembly in the pipe when the tool is rotated in a counterclockwise direction.

The lower sealing member includes a clean-out plug 68 threadedly attached to the lower depending end of the mandrel where it serves as a locking nut for the abutment means 60'. Standpipe 70 has the upper marginal end portion thereof apertured and is secured above radial port 44 by means of hollow plug 72 which may be secured to the inside peripheral wall surface of the mandrel by any suitable means. Annular chamber 74 is formed between the standpipe and the inside peripheral wall. A lower chamber 76 is formed by the before mentioned clean-out plug.

Figure 7:
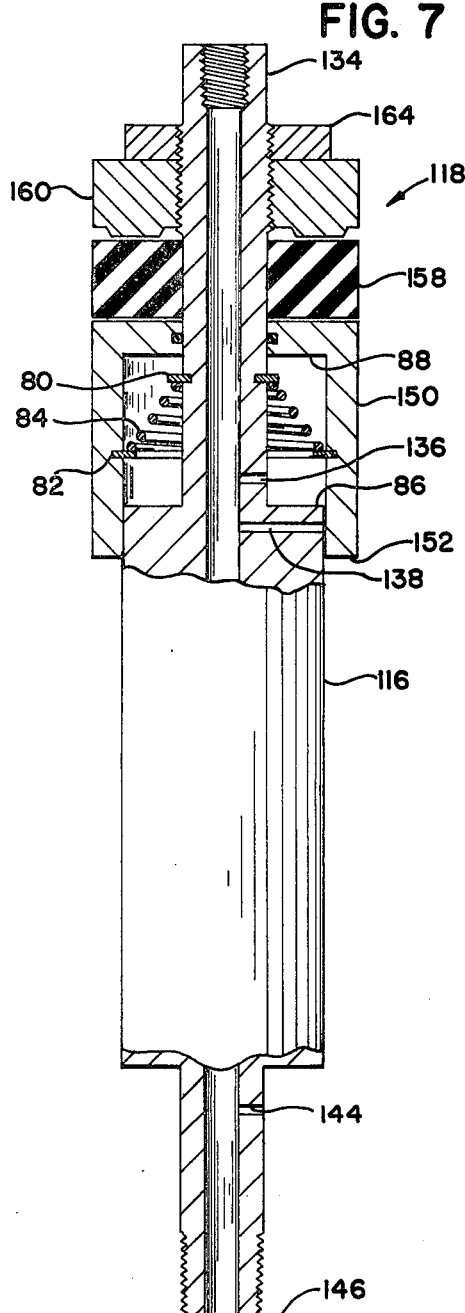
FIGURE 7 is a longitudinal partly cross-sectional view of a modification of the tool seen in FIGURE 2, with some parts being removed for clarity.

FIGURE 7 illustrates a modification of the tool seen in the foregoing figures. Movable member 150 is spring biased in a downward direction by means of the spaced apart snap rings 80 and 82 and spring 84. Snap ring 80 is placed within the illustrated circumferentially extending groove located on the outside peripheral wall surface of the upper mandrel portion, while lower snap ring 82 is placed within a circumferentially extending groove located on the inside peripheral wall of the movable member 150. Spring 84 is maintained compressed between the two illustrated snap rings. The central portion 116 of the mandrel is of constant diameter between the upper face 86 and the lower face thereof.

Figure 8:
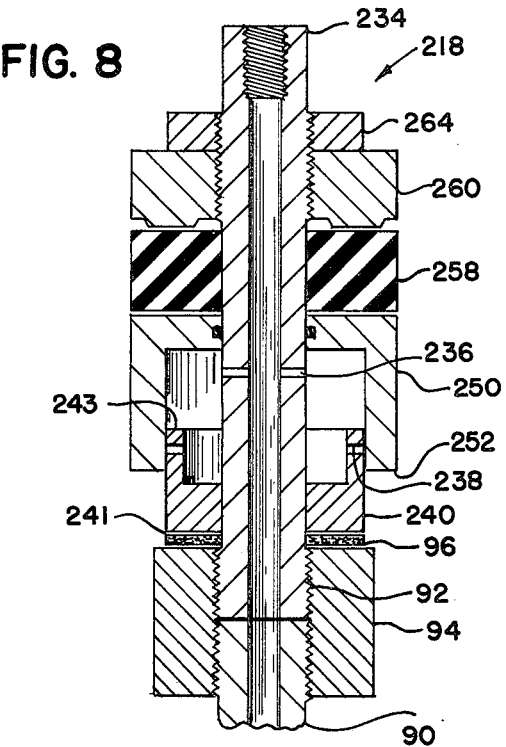
FIGURE 8 is a fragmentary longitudinal cross-sectional representation of still another modification of the tool seen in the foregoing figures.

In the details of the remaining embodiment illustrated in FIGURE 8 is a central mandrel portion 90 which is threadedly attached to a box 94. The box has an upper portion thereof attached to the upper mandrel portion by means of the screw threads seen at 92. Washer or spacer 96 is interposed between boss 240 and the upper face of the box. Movable member 250 includes an inside peripheral wall portion which is slidably received in close tolerance relationship about the outside peripheral wall of boss 240. Radial port 236 communicates the inside longitudinally extending passageway of the mandrel with the inside annular chamber formed between the movable member and the mandrel, while radial port 238 is provided within the boss so as to flow communicate the annular chamber with the outside surroundings of the tool when the lower edge portion 252 of movable member 250 moves in an upward direction with respect to the boss, thereby "clearing" or uncovering port 238. The lower sealing member (not shown) is fabricated in a manner similar to the illustrated upper sealing member.

In operation the tool is positioned with the upper and lower sealing members 18 and 20 isolating the area to be tested. As seen in FIGURE 1, the coupling means 26 is being tested and accordingly the tool is placed in a position whereby the coupling member is included within the high pressure test area formed by annulus 32.

In the specific embodiment of FIGURES 2 through 6, after the tool has been placed within the pipe in a manner whereby the annular chamber includes the coupling member 26, pressure is applied to the tubing 22, whereupon fluid flows into the longitudinally extending passageway of the tool. This action enables flow of fluid to occur through radial passageway 36 to thereby force the upper movable member in an upward direction. This action compresses packer 58 until it seals or is set against the inside peripheral wall of the pipe. At the same time fluid flows through the apertures of standpipe 70, through radial passageway 44, and into the annular chamber formed by the movable member and the boss, thereby causing the lower movable member to compress lower packer 58' against the inside peripheral wall surface of the pipe. The annular chamber 32 is now isolated. As the pressure within the upper and lower annular chambers increases, the lower depending end 52 of the skirt clears the radial ports 38, thereby enabling annulus 32 to receive the pressure imposed upon the longitudinal passageway of the mandrel. When this pressure attains the predetermined testing value the pressure source is maintained static, that is, under shut-in conditions. The pressure within the mandrel is observed by means of the illustrated pressure gauge. Should the pressure remain constant for several seconds, the joint is considered satisfactory and the pressure may be removed from the tubing 22. This action permits the annulus 32 to be reduced in pressure while fluid is drained from the upper and lower annular chambers of the upper and lower sealing members. As internal pressure is reduced, the packers return to their normal position. Any water remaining within the annulus 32 is then permitted to flow between the lower sealing member and the inside peripheral wall of the pipe. The tool may now be positioned so as to enclose the next area to be tested between the upper and lower sealing members.

Any foreign matter inadvertently entering the tool will accumulate within the chamber 74 or 76. The debris must occasionally be removed from the tool by unscrewing cleanout plug 68 and flushing the tool with water. Occasionally it is advisable to completely disassembly the tool in order to thoroughly clean and inspect the individual components thereof.

As will be noted in the preferred embodiment of FIGURES 2 through 6, the lower boss is not provided with a passageway for flow connection to annular chamber 32, since this expedient increases the possibility of contamination of the tool each time the pressure is released from the mandrel.

Loking now to the operation of the embodiment illustrated in FIGURE 7 wherein the upper and lower bosses which are slidably received within the upper and lower movable members are seen to consist of a constant diameter central mandrel portion 116; that is, the central mandrel portion between the upper and lower bosses is not undercut to provide the before mentioned oppositely disposed faces 40 and 42 of FIGURE 2, for example. By fabricating the bosses in this manner the quantity of fluid required in order to pressurize annular chamber 32 is greatly reduced.

In order to assure that packer 158 completely relaxes, the illustrated spring is maintained in compressed relationship so as to bias movable member 150 in a downward direction. The lower seal member (not shown) is provided with a similar spring arrangement. The tension of spring 84 is insignificant with respect to the total pressure required to set the respective packers.

Jam nut 164 can be loosened to thereby permit abutment means 160 to be adjusted to the most optimum position adjacent to the packer in the illustrated manner of FIGURE 7. The tool of the present invention can be used with a multiplicity of different pipe sizes by merely removing the jam nut, abutment means, packer, and movable member, whereupon either a larger or smaller diameter jam nut, abutment means, packer, and movable member can be assembled onto the mandrel. This feature enables a single mandrel to be used in testing a multiplicity of different sizes of pipe.

In the embodiment shown in FIGURE 8 the upper and lower bosses are in the form of an inverted piston. Box 94 enables various lengths and diameters of the central mandrel portion 90 to be incorporated into the tool. As in the before illustrated embodiments, a jam nut and abutment means provides a first adjustment means for the upper sealing member. Various thicknesses of spacers can be provided between the box and boss to provide a second adjustment means. With the tool in the standby configuration of FIGURE 8 the first and second adjustment means enables the lower edge portion of the skirt to be properly positioned with respect to radial ports 238 to thereby cause packer 258 to expand into sealing relationship with the wall as the radial port is uncovered. This enables the packers to be firmly set against the wall of the pipe prior to fluid flowing through passageway 236 and into the annular chamber 32.

The invention is not to be limited to the exact arrangement of parts shown in the accompanying drawings or described in this specification as various changes in the details of construction may be resorted to without departing from the spirit or scope of the invention.

Having thus described the invention what I claim is:

1. In a tool for testing sections of pipe wherein the tool is adapted to be slidably received within the pipe, an elongated mandrel having upper and lower sealing members spaced apart from each other and concentrically arranged about said mandrel; means forming a centrally located longitudinal passageway within said mandrel;

said upper and lower sealing members, respectively, including means forming an upper and lower boss, an upper and lower movable member, an upper and lower packer, and an upper and lower abutment means, respectively;

said upper and lower boss being spaced apart from one another and circumferentially disposed about said mandrel, said upper and lower boss being attached to said mandrel in a relatively fixed position during operation;

said upper movable member including a first inside cylindrical surface which is slidably received about said upper boss, and a second cylindrical surface slidably received about said mandrel;

said movable member, boss, and mandrel forming an upper chamber; said upper abutment means being attached to said mandrel in spaced apart relationship with respect to said movable member; said upper packer being circumferentially disposed about said mandrel and located between said upper movable member and said upper abutment means;

said lower movable member including a first inside cylindrical surface which is slidably received about said lower boss, and a second cylindrical surface slidably received about said mandrel; said movable member, boss, and mandrel forming a lower chamber; said lower abutment means being attached to said mandrel in spaced apart relationship with respect to said lower movable member; said lower packer being circumferentially disposed about said mandrel and located between said lower movable member and said lower abutment means;

means forming a flow passageway from said centrally located longitudinally extending passageway into said upper and lower chambers; means forming another flow passageway from said centrally located longitudinally extending passageway and through one of said bosses; one of the movable members normally enclosing said another passageway to prevent fluid flow therethrough; whereby pressure applied to longitudinally extending centrally located passageway causes said upper and lower movable members to move against their respective packers to thereby set the packers and to enable said movable member to slidably uncover said another passageway to thereby apply fluid pressure to the area between the packers.

2. The tool of claim 1 wherein each said boss includes means forming an upper and lower face arranged laterally with respect to the longitudinal passageway; said movable member including a depending cylindrical skirt which normally slidably encloses the outer peripheral surface of said boss;

said cylindrical skirt having an edge portion which is movable to a position which allows fluid flow from said another passageway when the packers are set.

3. The tool of claim 1 wherein said upper and lower bosses form the marginal end portions of a circumferentially disposed outwardly depending portion of said mandrel with the upper face of said upper boss and the lower face of said lower boss defining the terminal ends of said portion.

4. The tool of claim 1 wherein said central passageway is provided with a settling chamber in the form of a stand pipe, said stand pipe having an apertured upper marginal end portion and an enlargement at the lower terminal end portion thereof for affixing the stand pipe within the passageway;

said enlargement being located between said lower chamber passageway and said upper boss.

5. The tool of claim 1 wherein said upper and lower movable members and said mandrel are provided with biasing means for maintaining said movable member retracted when the tool is in the standby configuration.

6. The tool of claim 1 wherein said upper boss is in the form of an inverted hollow piston having an upwardly depending circumferentially disposed skirt; said skirt being slidably received within said movable member;

said means forming another passageway being located within said skirt of said boss and normally enclosed by said movable member; said movable member slidably moving clear of said another passageway when said packers are set to thereby enable fluid flow through said another passageway.

7. The tool of claim 1 wherein said upper boss is in the form of an inverted piston having an upwardly depending circumferentially disposed skirt; said skirt being slidably received within said movable member;

said means forming another flow passageway being located within said skirt of said boss;

an upper and lower box, said upper and lower box forming the central portion of said mandrel; said upper and lower box being threadedly secured to the upper and lower mandrel portions which carry the sealing members to thereby enable selection of the spaced apart distance between said upper and lower sealing members.

8. The tool of claim 1 wherein said upper and lower bosses include spaced apart circumferentially disposed outwardly projecting portions of said mandrel, each said boss having an upper and lower face arranged normal with respect to the longitudinal passageway; said movable member including a depending cylindrical skirt which normally slidably encloses the outer peripheral surface of said boss;

said upper and lower movable members and said mandrel are provided with biasing means for maintaining said movable member retracted when the tool is in the standby configuration.

References Cited

UNITED STATES PATENTS

| | | | |
|---|---|---|---|
| 2,793,524 | 5/1957 | Badger | 73—40.5 |
| 2,998,721 | 9/1961 | Gawlik | 73—49.1 |
| 3,071,960 | 1/1963 | Knapp et al. | 73—40.5 |
| 3,199,598 | 8/1965 | Loomis | 166—147 |

LOUIS R. PRINCE, Primary Examiner

W. A. HENRY II, Assistant Examiner

U.S. Cl. X.R.

166—191